(12) United States Patent
Loesch et al.

(10) Patent No.: US 11,467,251 B2
(45) Date of Patent: Oct. 11, 2022

(54) RADAR SENSOR SYSTEM AND METHOD FOR OPERATING A RADAR SENSOR SYSTEM

(71) Applicant: Robert Bosch GmbH, Stuttgart (DE)

(72) Inventors: Benedikt Loesch, Stuttgart (DE); Marcel Mayer, Lonsee (DE); Matthias Steinhauer, Steinheim (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 16/966,341

(22) PCT Filed: Dec. 27, 2018

(86) PCT No.: PCT/EP2018/086894
§ 371 (c)(1),
(2) Date: Jul. 30, 2020

(87) PCT Pub. No.: WO2019/170277
PCT Pub. Date: Sep. 12, 2019

(65) Prior Publication Data
US 2020/0371205 A1 Nov. 26, 2020

(30) Foreign Application Priority Data
Mar. 8, 2018 (DE) .......................... 102018203465.6

(51) Int. Cl.
*G01S 7/40* (2006.01)
*G01S 7/03* (2006.01)

(52) U.S. Cl.
CPC .............. *G01S 7/4017* (2013.01); *G01S 7/03* (2013.01); *G01S 7/4008* (2013.01); *G01S 7/4021* (2013.01)

(58) Field of Classification Search
None
See application file for complete search history.

(56) References Cited

U.S. PATENT DOCUMENTS

| 2007/0214884 | A1* | 9/2007 | Sakima | ............... G01D 3/0365 73/504.12 |
| 2010/0033375 | A1 | 2/2010 | Mason et al. | |
| 2010/0259182 | A1* | 10/2010 | Man | ........................ H05B 45/28 315/297 |

FOREIGN PATENT DOCUMENTS

| DE | 102012201990 A1 | 8/2013 |
| DE | 102013111512 A1 | 4/2015 |
| JP | H10253750 A | 9/1998 |

(Continued)

OTHER PUBLICATIONS

International Search Report for PCT/EP2018/086894, dated Mar. 28, 2019.

*Primary Examiner* — Whitney Moore
(74) *Attorney, Agent, or Firm* — Norton Rose Fulbright US LLP; Gerard Messina

(57) ABSTRACT

A radar sensor system having at least one transmitter device, all transmitter devices having a total of at least two transmit channels; and at least one receiver device, with all receiver devices having a total of at least two receive channels; a temperature sensor in each case for sensing the temperatures of the at least one transmitter device and the at least one receiver device, a modeling device for modeling at least one temperature dependency of the at least one transmitter device from the at least one receiver device; and a compensation device for compensating for the modeled temperature dependency.

14 Claims, 3 Drawing Sheets

(56) References Cited

FOREIGN PATENT DOCUMENTS

| | | |
|---|---|---|
| JP | 2003028951 A | 1/2003 |
| JP | 2009294071 A | 12/2009 |
| JP | 2010281596 A | 12/2010 |
| KR | 20160000279 A | 1/2016 |

* cited by examiner

RADAR SENSOR SYSTEM AND METHOD FOR OPERATING A RADAR SENSOR SYSTEM

FIELD

The present invention relates to a radar sensor system. Furthermore, the present invention relates to a method for operating a radar sensor system. In addition, the present invention relates to a computer program product.

BACKGROUND INFORMATION

The market for driver assistance systems is currently in transition. While it was predominantly cost-effective sensor systems that stood in the foreground over the past few years, the trend is presently moving in the direction of highly autonomous driving which poses considerably greater demands on the sensor system. In vehicles featuring a high degree of driver assistance functions or automated driving functions, an increasing number of sensors is installed for the control and regulation of the functions. The sensors installed in the vehicles can be radar sensors or lidar sensors, for instance, and have to provide the highest accuracy possible. Using precise sensors makes it possible to ensure the functional safety and reliability of the autonomous or semi-autonomous driving functions.

SUMMARY

It is an object of the present invention to provide a radar sensor system having an improved operating characteristic.

According to a first aspect of the present invention, the object may be achieved by a radar sensor system in accordance with an example embodiment of the present invention. In one example embodiment of the present invention, the radar sensor system has:
- at least one transmitter device, with all transmitter devices having a total of at least two transmit channels; and
- at least one receiver device, with all receiver devices having a total of at least two receive channels;
- a temperature sensor for acquiring the temperatures of the at least one transmitter device and the at least one receiver device;
- a modeling device for modeling at least one temperature dependency of the at least one transmitter device from the at least one receiver device; and
- a compensation device for compensating for the modeled temperature dependency.

In this way, a radar sensor system is provided, which advantageously allows for a compensation of signal drift caused by different temperatures. This advantageously supports an improved operating characteristic of the radar sensor system.

According to a second aspect of the present invention, the object may be achieved in accordance with an example embodiment of the present invention by a method for operating a radar sensor system. An example method according to the present invention has the steps:
- transmitting radar waves with the aid of at least one transmitter device, all transmitter devices having a total of at least two transmit channels;
- receiving the radar waves reflected at a target using at least one receiver device, all receiver devices having a total of at least two receive channels;
- Acquiring temperatures of the at least one transmitter device and the at least one receiver device;
- modeling at least one temperature dependency of the at least one transmitter device from the at least one receiver device with the aid of a modeling device; and
- compensating for the temperature dependency with the aid of a compensation device during the transmitting and receiving.

Advantageous further developments of the radar sensor system of the present invention are described herein.

Advantageous further developments of the radar sensor system include that the modeling device is situated internally or externally to the radar sensor system. This advantageously supports a high design freedom and design variety for the temperature-compensated radar sensor system.

Additional advantageous further developments of the radar sensor system according to the present invention provides for the placement of the compensation device internally or externally to the radar sensor system. This, too, advantageously allows for a high degree of design freedom and design variety for the radar sensor system, with the option of developing the compensation device in hardware in the case of an internal placement. In an external placement, a result of the compensation is able to be conveyed to the radar sensor system, with a temperature compensation (such as a phase displacement) being carried out in an external signal processing device, for example.

Another advantageous further development of the radar sensor system according to the present invention includes that a temperature-dependent phase shift of signals from the receiver device and/or the transmitter device and/or an HF signal generation device is able to be modeled with the aid of the modeling device. In an advantageous manner, this makes it possible to essentially eliminate temperature-related phase shifting, which improves a detection quality of the radar sensor system.

Another advantageous further development of the radar sensor system according to the present invention includes that a linear dependency of signals of the transmit channels of the transmitter device and/or of signals of the receive channels of the receiver device is able to be modeled with the aid of the modeling device. In this way, a dependency of signals is emulated in a model that largely corresponds to a physical reality.

Another advantageous further development of the radar sensor system according to the present invention includes that the compensation device is developed as a phase shifter element. As a result, the compensation of the temperature dependency is advantageously able to be performed directly on the component in hardware.

Another advantageous further development of the radar sensor system according to the present invention includes that a rough compensation of the temperature dependency is able to be performed with the aid of the phase shifter element, and a fine compensation of the temperature dependency is able to be carried out arithmetically with the aid of a signal processing device. This makes it possible to realize a type of two-stage realization of the provided compensation method, as a result of which a finely graduated compensation of the temperature dependency is able to be realized.

An additional advantageous further development of the radar sensor system according to the present invention includes that the radar sensor system has a plurality of HF components, and all HF components are functionally connected to a synchronization network, and an HF signal from an HF signal generation device is able to be provided to all HF components via the synchronization network. In this way, a multi-cascading radar sensor system is advantageously provided, which advantageously has a temperature-compensated operating behavior.

Below, preferred exemplary embodiments of the present invention are described in greater detail on the basis of heavily simplified schematic representations.

BRIEF DESCRIPTION OF THE DRAWINGS

Identical constructive elements in the figures have been provided with identical reference numerals in each case.

DETAILED DESCRIPTION OF EXAMPLE EMBODIMENTS

Current radar sensors generally have a plurality of HF channels (transmit and receive channels) for transmitting and receiving radar waves. During a normal operation, all HF channels may be in operation at the same time.

Figure 1:
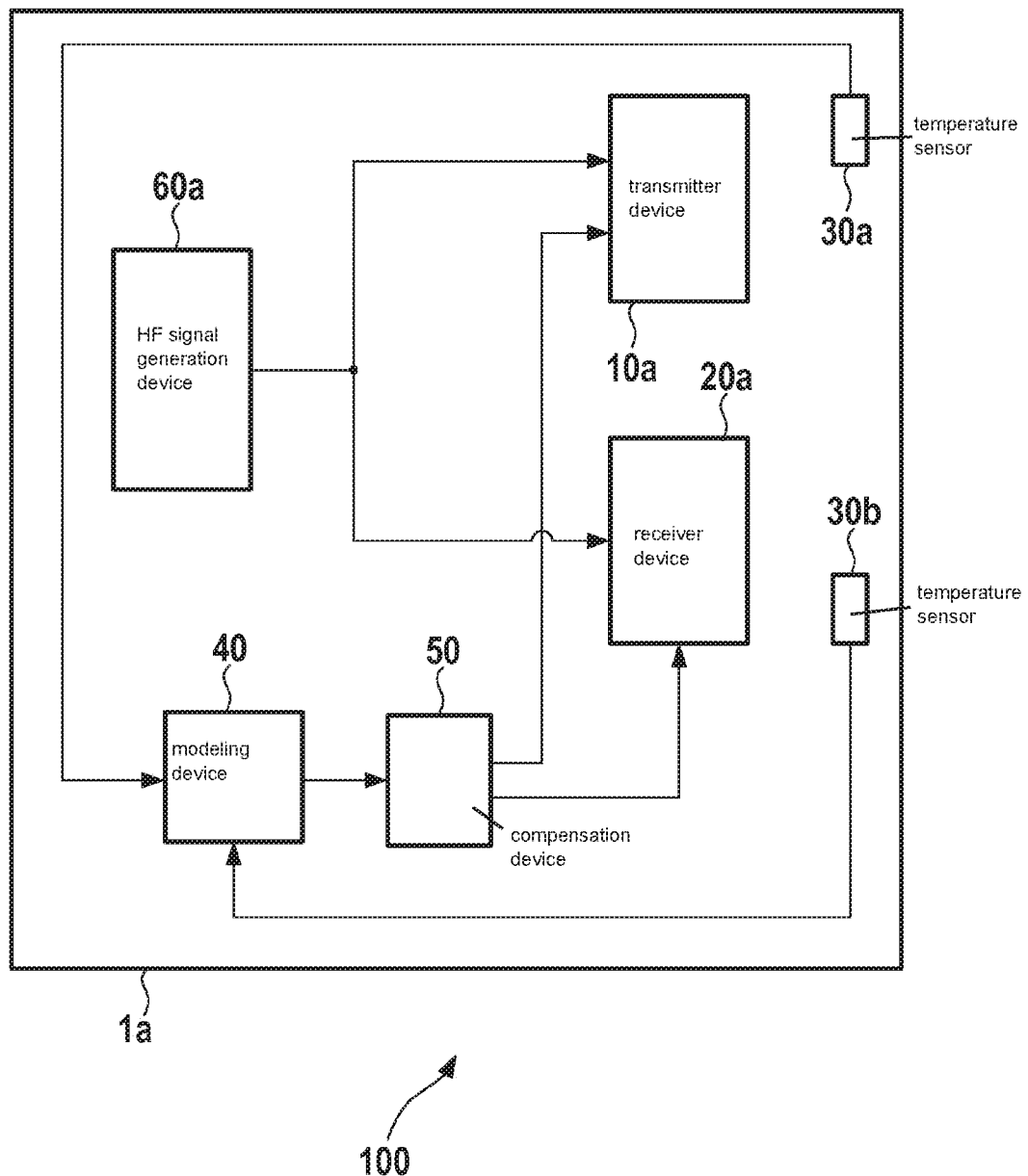
FIG. 1 shows a schematic representation of a specific example embodiment of a radar sensor system according to the present invention.

FIG. 1 shows a basic embodiment of a provided radar sensor system 100. Radar sensor system 100 is made up of a single HF component 1a, preferably in the form of an MMIC (monolithic microwave integrated circuit), which has a transmitter device 10a including a plurality of transmit channels (not shown), and a receiver device 20a having a plurality of receive channels (not shown). An HF signal (LO signal) for transmitter device 10a and for receiver device 20a is supplied with the aid of an HF signal generation device 60a. Visible are temperature sensors 30a, 30b, which sense temperatures of transmitter device 10a and receiver device 20a and convey the ascertained temperature values to a modeling device 40.

Using modeling device 40, the temperature response of the transmitter and receiver devices is modeled and the results are conveyed to a compensation device 50. With the aid of compensation device 50, which may be developed as a phase shifter element, for example, a compensation of the temperature-related drift of the signals of the receive channels of receiver device 20a and the transmit channels of transmitter device 10a is able to be carried out. In the final analysis, this advantageously supports a temperature-compensated operating behavior of the transmitter and receiver devices. Using the model, linear temperature dependencies of the channels, for example, are able to be modeled, but mathematically more complex models, e.g., with higher order polynomials, are possible as well.

In the mathematical model provided by modeling device 40, transmission functions of relevant components, for example, are able to be described, e.g., a phase dependency of a power amplifier (PA) as a function of the temperature. During an ongoing operation, the temperature is then determined and the effect is compensated for based on the model. A typical characteristic is described by a phase shift which depends on the temperature of the component in an approximately linear manner. Therefore, the gradient of the mentioned linear characteristic is essential as a parameter of the model as well as the temperature as an input variable. The phase drift that has to be corrected is then determined via the model.

Given a plurality of MMICs, there is the possibility of temperature-dependent drift between the different components. Even if all MMICs exhibit an identical behavior, different transmission functions (e.g., amplitude and phase) of different modules within the MMIC (e.g., amplifier, mixer) may occur as a result of temperature differences among the components. The conventional approach consists of minimizing these drifts, i.e. the differences, with the aid of a corresponding symmetrical design. However, this requires complex, additional design elements (such as a central HF signal-generating component), and thus additional expense. The present invention advantageously allows for a compensation of the drift at a low or no additional expense.

In a multi-MMIC system, corresponding multiple temperatures and phase shifts exist, so that the correction requires a correspondingly larger mathematical system of equations.

The model ideally orientates itself on the basis of modules in the MMIC or in the overall system. It is possible to combine individual groups such as a chain of power amplifiers for the HF signal distribution in the master, the HF signal line on the circuit board as well as the input circuit for the HF signal sensing in the slave MMIC. In this context, it may be advantageous to combine the modeling or to separate it, depending on the dependencies of the characteristic curve.

The compensation with the aid of compensation device 50 is able to be accomplished in different ways. Ideally, the compensation is carried out directly in the component; in other words, the transmission phase of a transmit signal is directly corrected with the aid of a phase shifter element, for instance, with this phase shifter element being actuated with support from the model (e.g., as a function of the temperature).

Alternatively, the compensation may also be carried out arithmetically in a signal evaluation unit (not shown), where the model is determined and corresponding signals for combinations of transmit and receive channels are compensated for according to the model.

A combination of both mentioned approaches is also possible, e.g., performing a rough correction in the MMIC and performing a fine correction in the processor. As a rule, a correction of phase positions with the aid of the phase shifter elements is possible only in rougher steps, e.g., in 5° or 10° steps, with an estimated residual error being corrected in the signal processing unit.

The characteristic curves required for the model are preferably ascertained per design or are alternatively able to be ascertained by a measurement (e.g., on the chip, in the factory or in the sensor).

The design of the radar sensor system may be made up of conventional cost-effective basic components, for instance. An improvement in the power and the accuracy of the radar sensor system is able to be realized by a parallelization of a plurality of components of the same type. In addition, redundancy for providing a reliable function of the system is possible by using multiple components of the same type. An emergency operation of the radar sensor system is thereby able to be realized in a technically uncomplicated manner. However, in addition to the HF components and the microcontrollers, redundancy must also exist in the clock pulse generation. For example, the HF components may be antenna controls or amplifiers developed in the form of MMICs.

Because all HF components are supplied with a usable or basic frequency by a common clock pulse generator, the radar sensor system has high coherence. In particular, the different HF components are able to be operated at an identical operating frequency so that a redundant and coherent clock pulse supply of a plurality of HF components is possible.

Preferably, at least a portion of the HF components used in the radar sensor system is able to be supplied with a clock pulse or a usable frequency. During a normal operation, all HF components or antenna controls of the radar sensor may be supplied with the same clock pulse by at least one clock pulse generator and all data are thereby able to be offset against one another.

Normally, one component in a radar sensor system is assigned the role of the master who assumes the high frequency generation and supplies the other HF components with the HF synchronization signal. The HF synchronization signal is required in order to provide a high coherence of HF components $1a$ . . . $1d$ for the purpose of allowing a high angular resolution of radar sensor system 100 to be achieved. The related art uses specialized components for generating the high frequency and for the further signal processing.

Figure 2:
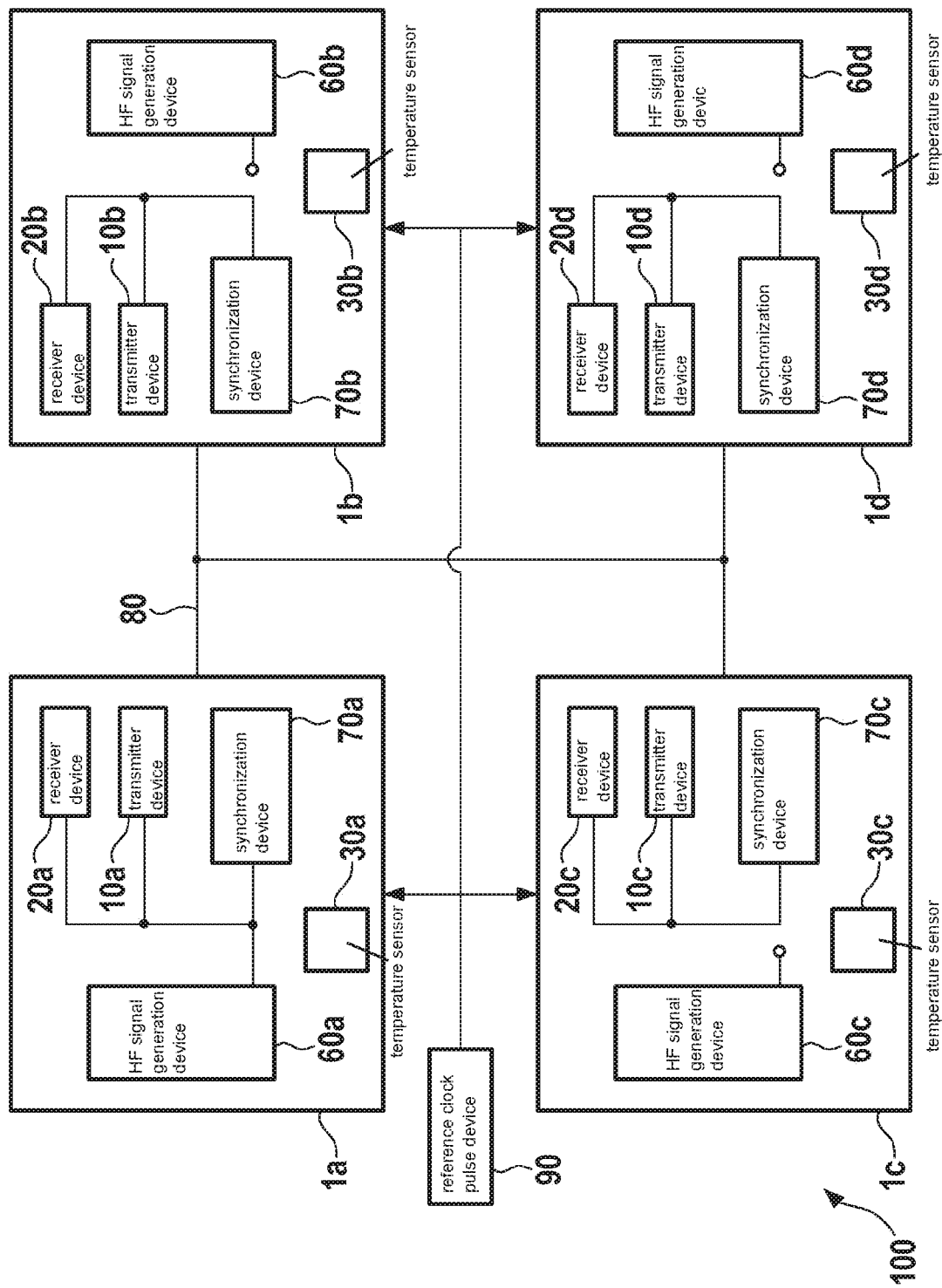
FIG. 2 shows a further specific embodiment of a radar sensor system according to the present invention.

FIG. 2 shows a schematic illustration of such a temperature-compensated radar sensor system 100 in accordance with an example embodiment of the present invention. Radar sensor system 100 has four HF components $1a$ . . . $1d$ embodied as MMICs. The number four is only an example and the provided radar sensor system 100 can also have fewer or more than four HF components. In addition, a synchronization network 80 can be seen to which all HF components $1a$ . . . $1d$ are functionally connected and which is used for the synchronization of the HF operating frequency of all HF components $1a$ . . . $1d$. It is provided that the entirety of all transmitter devices $10a$ . . . $10n$ of all HF components $1a$ . . . $1d$ jointly has at least two transmit channels, and the entirety of all receiver devices $20a$ . . . $20n$ of all HF components $1a$ . . . $1d$ jointly has at least two receive channels.

It can be seen that only HF element $1a$ uses its HF signal generation device $60a$ in order to convey an HF signal to transmitter and receiver devices $10a$, $20a$. Using a synchronization device $70a$, the generated HF signal is conveyed to all other HF components $1b$, $1c$, $1d$. As a result, HF signal generation devices $60b$, $60c$, $60d$ of HF components $1b$, $1c$, $1d$ are functionless.

A model of a cascading multi-MMIC system is realized in this manner, in which oscillators, transmitters and receivers as well as required modules for the HF signal distribution are used in HF components $1a$ . . . $1d$. Using this model and the individual temperatures of the MMICs, it is possible to determine and compensate for the drift. This makes it possible to omit design elements that provide symmetry and to develop radar sensor system 100 in a more cost-effective manner.

HF component $1a$ in the network of radar sensor system 100 assumes the master functionality. In this way, HF component $1a$ in radar sensor system 100 functions as the master, while the three other HF components $1b$, $1c$, $1d$ function as slave HF components.

In addition, radar sensor system 100 has antenna controls of HF components $1a$ . . . $1d$. For the sake of simplicity, further components of HF components $1a$ . . . $1d$, which are required for emitting and receiving radar waves, e.g., antennas, amplifiers, oscillators, etc., are not shown in the figures.

In addition, a reference clock pulse device 90 can be seen, which supplies entire radar sensor system 100 with a reference clock pulse such as 50 MHz (e.g., for the supply of A/D converters, sequencers, etc.).

During a normal operation of radar sensor system 100, HF component $1a$ functioning as the master assumes a plurality of the tasks mentioned in the following text:
 a frequency generation using PLL (e.g., 77 GHz) and possibly a clock pulse generation (e.g., 50 MHz)
 the output and amplification of the HF synchronization signal
 in part, the supply of the transmission signal
 mixing into the base band
 possibly, an AD conversion and output of the digital signals The two initially mentioned tasks are normally exclusively assumed by master HF component $1a$, while the three tasks mentioned last are carried out by all involved HF components $1a$ . . . $1d$ of radar sensor system 100.

In radar sensor system 100 of FIG. 2, HF component $1a$ thus forms the master while the other HF components $1b$, $1c$, $1d$ represent the slaves. Each of HF components $1a$ . . . $1d$ is equipped with a temperature sensor $30a$ . . . $30d$, which is read out appropriately. The mathematical model provided by modeling device 40 (not shown) is now able to model the path from the master to the slave, for instance, by utilizing the dependency of synchronization devices $70a$ . . . $70d$ of the master and the slaves and to thereby model and thus correct the offset of signals between master receiver device $20a$ and slave transmitter devices $10b$ . . . $10d$, for instance.

In an advantageous manner, the provided method is able to be used not only in a radar sensor system but also in any product having a plurality of HF components. The provided radar sensor system is preferably used in the automotive field.

Figure 3:
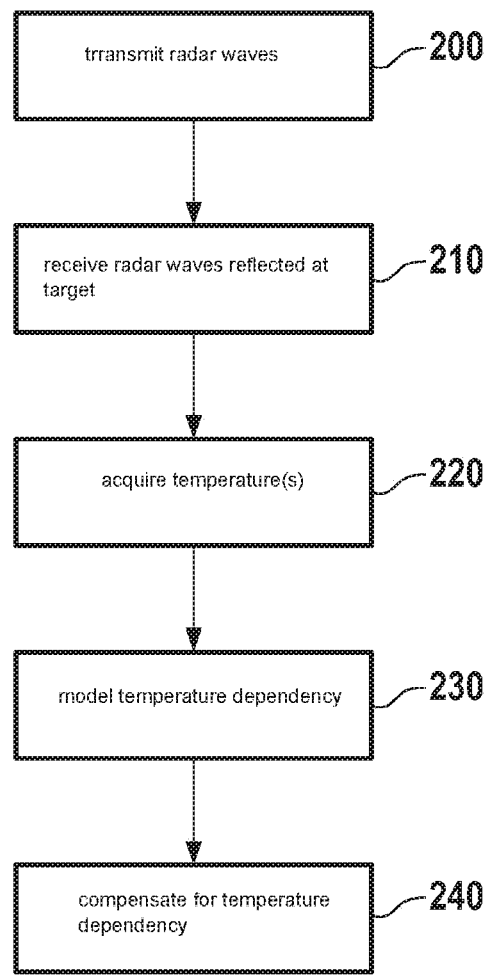
FIG. 3 shows a basic flow diagram of an example method for operating a radar sensor system in accordance with the present invention.

FIG. 3 shows a basic flow diagram of a method for operating a radar sensor system 100.

In a step 200, a transmission of radar waves is carried out with the aid of at least one transmitter device $10a$ . . . $10n$, all transmitter devices having a total of at least two transmit channels.

In a step 210, receiving of the radar waves, reflected at a target, is carried out using at least one receiver device $20a$ . . . $20n$, with all receiver devices having at least two receive channels.

In a step 220, an acquisition of temperatures of the at least one transmitter device $10a$ . . . $10n$ and the at least one receiver device $20a$ . . . $20n$ is carried out.

In a step 230, modeling of at least one temperature dependency of the at least one transmitter device $10a$ . . . $10n$ from the at least one receiver device $20a$ . . . $20n$ is performed with the aid of a modeling device 40.

In a step 240, the temperature dependency is compensated for with the aid of a compensation device 50 during the transmitting and receiving.

It is of course understood that the sequence of the aforementioned steps may also be suitably switched. For example, it is also possible to prepare the model of the temperature dependencies already prior to the transmitting and receiving of the radar waves.

In an advantageous manner, the example method is also able to be implemented as a software that is running in a control device (not shown) of radar sensor system 100. This advantageously makes it easy to modify the present method.

In summary, the present invention provides a radar sensor system and a method for operating the radar sensor system by which temperature drift of components of the radar sensor system is able to be compensated for. Using modeling of the mentioned temperature drifts and a subsequent compensation of the drifts, an outlay for eliminating the temperature drifts is able to be kept to a minimum in an advantageous manner. This is ultimately supported in that the entire radar sensor system is calibrated and/or features a temperature compensation, for which purpose it may possibly also be provided not to offer an individual compensation for individual blocks/elements/components.

One skilled in the art is therefore able to realize, based on the disclosure herein, embodiments that are not described or only partially described above without deviating from the core of the present invention.

What is claimed is:

1. A radar sensor system, comprising:
    at least one transmitter device, all of the at least one transmitter device jointly having a total of at least two transmit channels; and
    at least one receiver device, all of the at least one receiver device jointly having a total of at least two receive channels;
    a temperature sensor configured to acquire a temperatures of the at least one transmitter device and the at least one receiver device;
    a modeling device configured to model at least one temperature dependency of the at least one transmitter device on the at least one receiver device; and
    a compensation device configured to compensate for the modeled temperature dependency;
    wherein the radar sensor system has a plurality of HF components, and all of the HF components are functionally connected to a synchronization network, and an HF signal generation device is configured to provide an HF signal to all of the HF components via the synchronization network.

2. The radar sensor system as recited in claim 1, wherein the modeling device is situated internally or externally to the radar sensor system.

3. The radar sensor system as recited in claim 1, wherein the compensation device is situated internally or externally to the radar sensor system.

4. The radar sensor system as recited in claim 1, wherein the modeling device is configured to model a temperature-dependent phase shift of signals from the receiver device and/or the transmitter device and/or the HF signal generation device.

5. The radar sensor system as recited in claim 4, wherein the modeling device is configured to model a linear dependency of signals of the transmit channels of the transmitter device and/or of signals of the receive channels of the receiver device.

6. The radar sensor system as recited in claim 1, wherein the compensation device is a phase shifter element.

7. The radar sensor system as recited in claim 6, wherein the phase shifter element is configured to perform a rough compensation for the temperature dependency, and a signal processing device of the radar system is configured to perform a fine compensation arithmetically for the temperature dependency.

8. A method for operating a radar sensor system, the method comprising:
    transmitting, via a transmitter device, radar waves using at least one transmitter device, all of the at least one transmitter device jointly having a total of at least two transmit channels;
    receiving, via a receiver device, the radar waves, reflected at a target, using at least one receiver device, all of the at least one receiver device having a total of at least two receive channels;
    acquiring temperatures of the at least one transmitter device and the at least one receiver device;
    modeling, via a modeling device, at least one temperature dependency of the at least one transmitter device on the at least one receiver device using a modeling device; and
    compensating, via a compensation device, for the temperature dependency using a compensation device during further transmitting and receiving;
    wherein the radar sensor system has a plurality of HF components, and all of the HF components are functionally connected to a synchronization network, and an HF signal generation device is configured to provide an HF signal to all of the HF components via the synchronization network.

9. The method as recited in claim 8, wherein the modeling device is situated internally or externally to the radar sensor system.

10. The method as recited in claim 8, wherein the compensation device is situated internally or externally to the radar sensor system.

11. The method as recited in claim 8, wherein the modeling device is configured to model a temperature-dependent phase shift of signals from the receiver device and/or the transmitter device and/or the HF signal generation device.

12. The method as recited in claim 11, wherein the modeling device is configured to model a linear dependency of signals of the transmit channels of the transmitter device and/or of signals of the receive channels of the receiver device.

13. The method as recited in claim 8, wherein the compensation device includes a phase shifter element.

14. The method as recited in claim 13, wherein the phase shifter element is configured to perform a rough compensation for the temperature dependency, and a signal processing device of the radar system is configured to perform a fine compensation arithmetically for the temperature dependency.

* * * * *